(12) United States Patent
Nakamura et al.

(10) Patent No.: US 8,355,618 B2
(45) Date of Patent: Jan. 15, 2013

(54) IMAGE RECORDING SYSTEM, IMAGE RECORDING APPARATUS, AND IMAGE RECORDING METHOD

(75) Inventors: Takayuki Nakamura, Osaka (JP); Hideki Ohtaka, Osaka (JP)

(73) Assignee: Panasonic Corporation, Osaka (JP)

( * ) Notice: Subject to any disclaimer, the term of this patent is extended or adjusted under 35 U.S.C. 154(b) by 203 days.

(21) Appl. No.: 13/034,801

(22) Filed: Feb. 25, 2011

(65) Prior Publication Data

US 2012/0128320 A1 May 24, 2012

(30) Foreign Application Priority Data

Nov. 22, 2010 (JP) .................................. 2010-259745

(51) Int. Cl.
*H04N 9/80* (2006.01)
(52) U.S. Cl. ...................................................... 386/239
(58) Field of Classification Search .................... 386/239
See application file for complete search history.

(56) References Cited

U.S. PATENT DOCUMENTS

2008/0022205 A1   1/2008   Shinkai et al.
2009/0092377 A1*  4/2009   Kim ............................... 386/109
2011/0199469 A1*  8/2011   Gallagher ....................... 348/60
2011/0261158 A1* 10/2011   Suh et al. ....................... 348/43

FOREIGN PATENT DOCUMENTS

| JP | 7-236163    | 9/1995  |
| JP | 7-250350    | 9/1995  |
| JP | 8-307903    | 11/1996 |
| JP | 2001-186543 | 7/2001  |
| JP | 2008-027492 | 2/2008  |

* cited by examiner

*Primary Examiner* — Thai Tran
*Assistant Examiner* — William Tran
(74) *Attorney, Agent, or Firm* — Panasonic Patent Center (57) ABSTRACT

The image recording system is a system configured of first and second image recording apparatuses. The first image recording apparatus includes a device ID obtainment unit, a time information obtainment unit, a first channel information input unit, an identification information creation unit, a first image input unit, a first identification information addition unit, a first image recording unit, and an identification information sending unit. The second image recording apparatus includes an identification information receiving unit, a second channel information input unit, an identification information change unit, a second image input unit, a second identification information addition unit, and a second image recording unit.

5 Claims, 5 Drawing Sheets

500 | Universal Label | Length | Instance Number 00 00 00 | Material Number AB CD FE 00 11 22 33 44 55 66 77 88 |

FIG. 5B

501 | Universal Label | Length | 00 00 01 | AB CD FE 00 11 22 33 44 55 66 77 88 |

FIG. 5C

502 | Universal Label | Length | 00 00 02 | AB CD FE 00 11 22 33 44 55 66 77 88 |

IMAGE RECORDING SYSTEM, IMAGE RECORDING APPARATUS, AND IMAGE RECORDING METHOD

CROSS-REFERENCE TO RELATED APPLICATIONS

This application claims priority to Japanese Patent Application No. 2010-259745, filed on Nov. 22, 2010. The entire disclosure of Japanese Patent Application No. 2010-259745 is hereby incorporated herein by reference.

BACKGROUND

1. Technical Field

The technology disclosed herein relates to image recording apparatus, image recording system, and image recording method.

2. Background Information

A conventional recording apparatus adds identification information indicating the shooting angle when an image is shot from multiple angles. For example, JP-H7-250350A (called "Patent Document 1" hereinafter) discloses a recording apparatus. The recording apparatus is configured of an input unit, an encoding unit, a multiplexing unit, an identification code generating unit, and a code adding unit. The input unit is configured of an image input unit. The image input unit inputs pieces of image data obtained by shooting images from multiple angles. The encoding unit encodes the image data obtained by the input unit on a shooting angle-by-shooting angle basis. The multiplexing unit is configured of a multiplexer. The multiplexer multiplexes the encoded data obtained by the encoding unit on a shooting angle-by-shooting angle basis, and outputs the multiplexed data as a sequence of compressed and encoded data. The identification code generating unit generates an identification code for each shooting angle of the image data. The code adding unit adds the identification codes obtained by the identification code generating unit to the respective pieces of encoded image data for each of the shooting angles.

The conventional recording apparatus merges image data which is shot from multiple angles into a single file and records the file. Specifically, the conventional recording apparatus records the image data from multiple angles sequentially on a frame-by-frame basis. Thus a final file is composed of the data which is multiplexed the image data which is shot from multiple angles in each frame.

For example, in the case that only a single piece of image data among the image data from the multiple angles is modified in the final file, it is necessary to separate only the piece of image data that is modified from the final file. However, the processing for separating out only the image data to be modified is extremely difficult. Furthermore, even if the image data to be modified is successfully separated out, it is necessary to reconstruct the file in the aforementioned format after the image data has been modified. However, the process for this reconstruction is extremely difficult as well.

Meanwhile, the recording apparatuses record 2D image data and multiplexed 3D image data in a mixed state as a single file in some cases. In such a cases, there has been a problem in that the two pieces of image data cannot be easily distinguished from each other.

SUMMARY

The image recording system disclosed herein is a system configured of first and second image recording apparatuses. The first image recording apparatus is configured to record a first image signal. The second image recording apparatus is configured to record a second image signal. The first image signal and the second image signal configure a 3D image.

The first image recording apparatus includes a device ID obtainment unit, a time information obtainment unit, a first channel information input unit, an identification information creation unit, a first image input unit, a first identification information addition unit, a first image recording unit, and an identification information sending unit. The device ID obtainment unit is configured to identify the first image recording apparatus. The time information obtainment unit is configured to obtain time information. The first channel information input unit is configured to input channel information. The channel information is information to identify whether an image signal is the first image signal or the second image signal.

The identification information creation unit is configured to create identification information. The identification information is information to uniquely identify the image signal based on the information obtained by the device ID obtainment unit, the time information obtainment unit, and the first channel information input unit. The first image input unit is configured such that the first image signal is input therein. The first identification information addition unit is configured to add the identification information created by the identification information creation unit to the first image signal. The first image recording unit is configured to record the first image signal to which the identification information has been added by the first identification information addition unit. The identification information sending unit is configured to send, to the second image recording apparatus, the identification information created by the identification information creation unit.

The second image recording apparatus includes an identification information receiving unit, a second channel information input unit, an identification information change unit, a second image input unit, a second identification information addition unit, and a second image recording unit. The identification information receiving unit is configured to receive the identification information sent from the identification information sending unit of the first image recording apparatus. The second channel information input unit is configured to input channel information. The channel information is information to identify whether an image signal is the first image signal or the second image signal.

The identification information change unit is configured to change the identification information received by the identification information receiving unit based on the channel information input by the second channel information input unit. The second image input unit is configured such that the second image signal is input therein. The second identification information addition unit is configured to add the identification information obtained by the identification information change unit to the second image signal. The second image recording unit is configured to record the second image signal to which the identification information has been added by the second identification information addition unit.

Channel information in identification information is different in two image signals of 3D image recorded at the same time, and thus the image signals can be identified with ease. Thus at least one of the two image signals recorded at the same time can be modified with ease. Furthermore, the information aside from the channel information in the identification information is the same for the two image signals of the 3D image recorded at the same time, and thus image signal pairs can be determined with ease. Thus the two image signals can be recognized as a pair with certainty even if one or both of the image signals has been modified. Furthermore, because the channel information in identification information differs between 2D images and 3D images, it is easy to distinguish between 2D images and 3D images.

BRIEF DESCRIPTION OF DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

1: Configuration of Image Recording System

Figure 1:
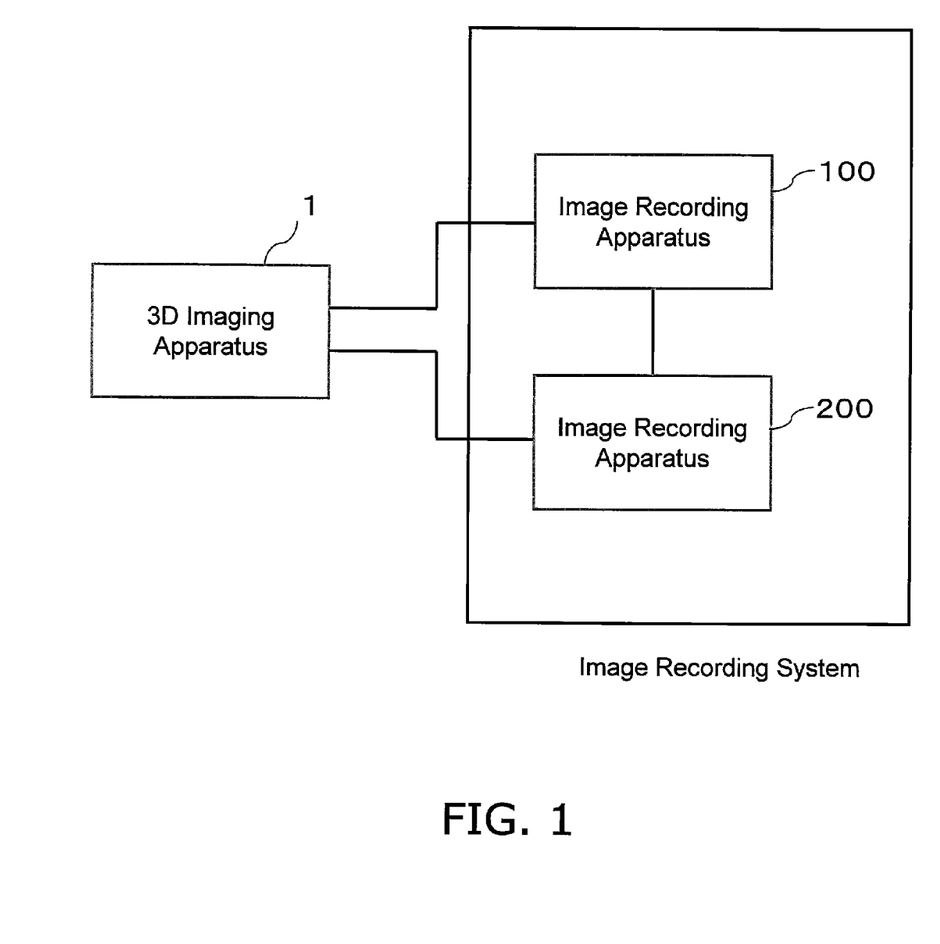
FIG. 1 is a diagram illustrating the overall configuration of an image recording system according to a first embodiment.

FIG. 1 is a diagram which illustrates the overall configuration of an image recording system according to a first embodiment. A 3D imaging apparatus 1 is a dual-lens imaging apparatus that outputs a left-lens image and a right-lens image that configure 3D image as individual image signals. The image recording system is configured of an image recording apparatus 100 that records the left-lens image output by the 3D imaging apparatus 1 and an image recording apparatus 200 that records the right-lens image output by the 3D imaging apparatus 1. The image recording apparatus 100 and the image recording apparatus 200 are connected via a network, and are capable of exchanging data with each other.

Figure 2:
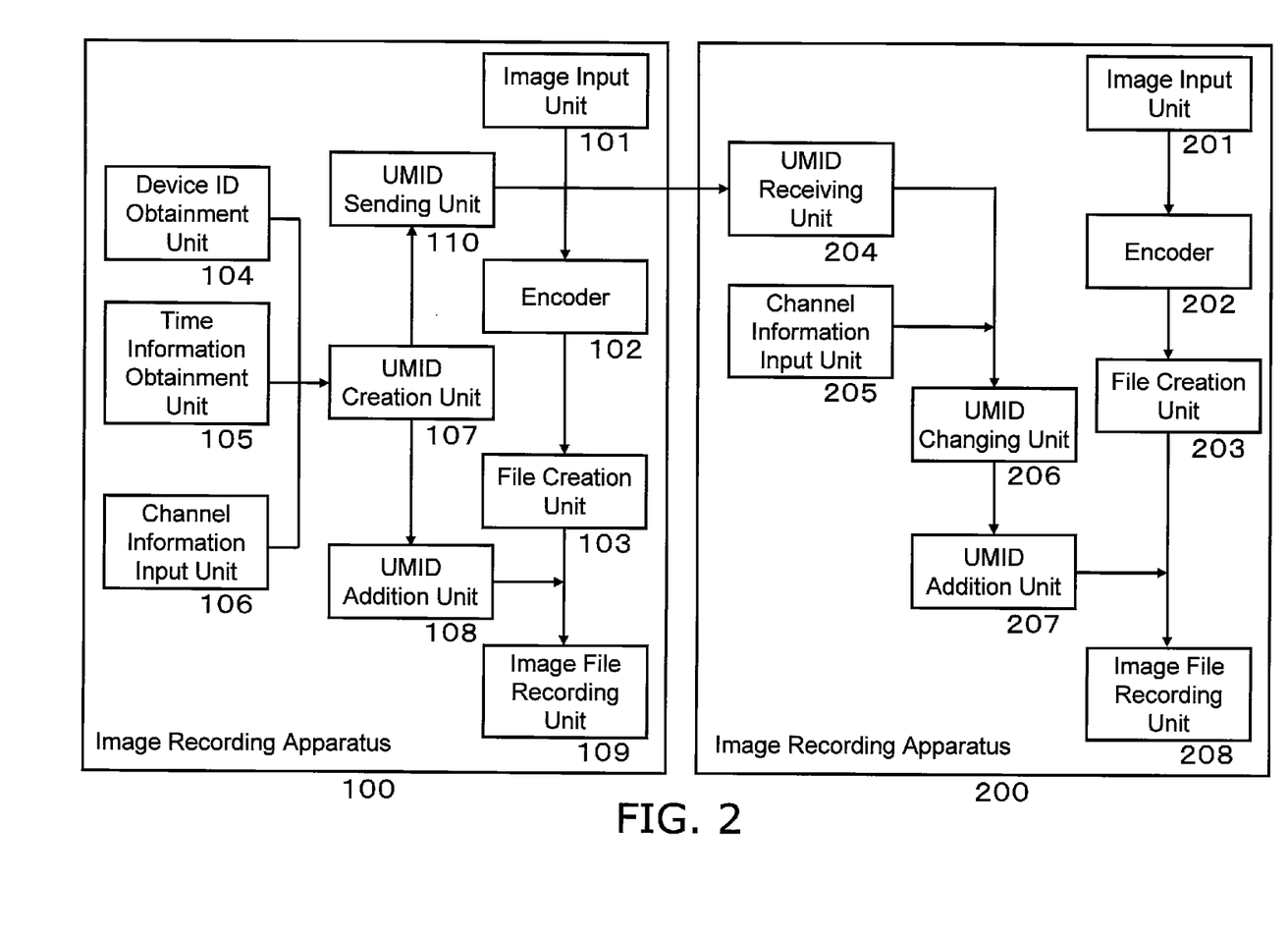
FIG. 2 is a block diagram illustrating the configurations of image recording apparatuses that configure the image recording system according to the first embodiment.

FIG. 2 is a block diagram which illustrates the configuration of the image recording apparatuses of which the image recording system is configured. The image recording apparatus 100 is configured of an image input unit 101, an encoder 102, a file creation unit 103, a device ID obtainment unit 104, a time information obtainment unit 105, a channel information input unit 106, a UMID creation unit 107, a UMID addition unit 108, an image file recording unit 109, and a UMID sending unit 110.

An L channel image signal is input into the image input unit 101. The L channel image signal is a signal corresponding to the left-lens image output by the 3D imaging apparatus 1. The encoder 102 encodes an image signal input into the image input unit 101. The file creation unit 103 creates a file including data encoded by the encoder 102. The file includes, for example, an MXF file (Material eXchange Format File). MXF is a container format. The device ID obtainment unit 104 identifies the device that created a file by obtaining information of the device that created the file. The time information obtainment unit 105 obtains time information. The channel information input unit 106 inputs channel information.

The UMID creation unit 107 creates a UMID (Unique Material Identifier) based on the information obtained by the device ID obtainment unit 104, the time information obtainment unit 105, and the channel information input unit 106. The UMID addition unit 108 adds the UMID created by the UMID creation unit 107 to the image file output by the file creation unit 103. The image file recording unit 109 records the image file to which the UMID has been added by the UMID addition unit 108. The UMID sending unit 110 sends the UMID created by the UMID creation unit 107 to the R-side image recording apparatus 200.

The image recording apparatus 200 is configured of an image input unit 201, an encoder 202, a file creation unit 203, a UMID receiving unit 204, a channel information input unit 205, a UMID changing unit 206, a UMID addition unit 207, and an image file recording unit 208.

An R channel image signal is input into the image input unit 201. The R channel image signal is a signal corresponding to the right-lens image output by the 3D imaging apparatus 1. The encoder 202 encodes an image signal input into the image input unit 201. The file creation unit 203 creates a file including data encoded by the encoder 202. The UMID receiving unit 204 receives the UMID sent from the UMID sending unit 110 of the image recording apparatus 100. The channel information input unit 205 inputs channel information.

The UMID changing unit 206 changes the UMID received by the UMID receiving unit 204 based on the channel information input by the channel information input unit 205. The UMID addition unit 207 adds the UMID obtained by the UMID changing unit 206 to the image file output by the file creation unit 203. The image file recording unit 208 records the image file to which the UMID has been added by the UMID addition unit 207.

Figure 4:
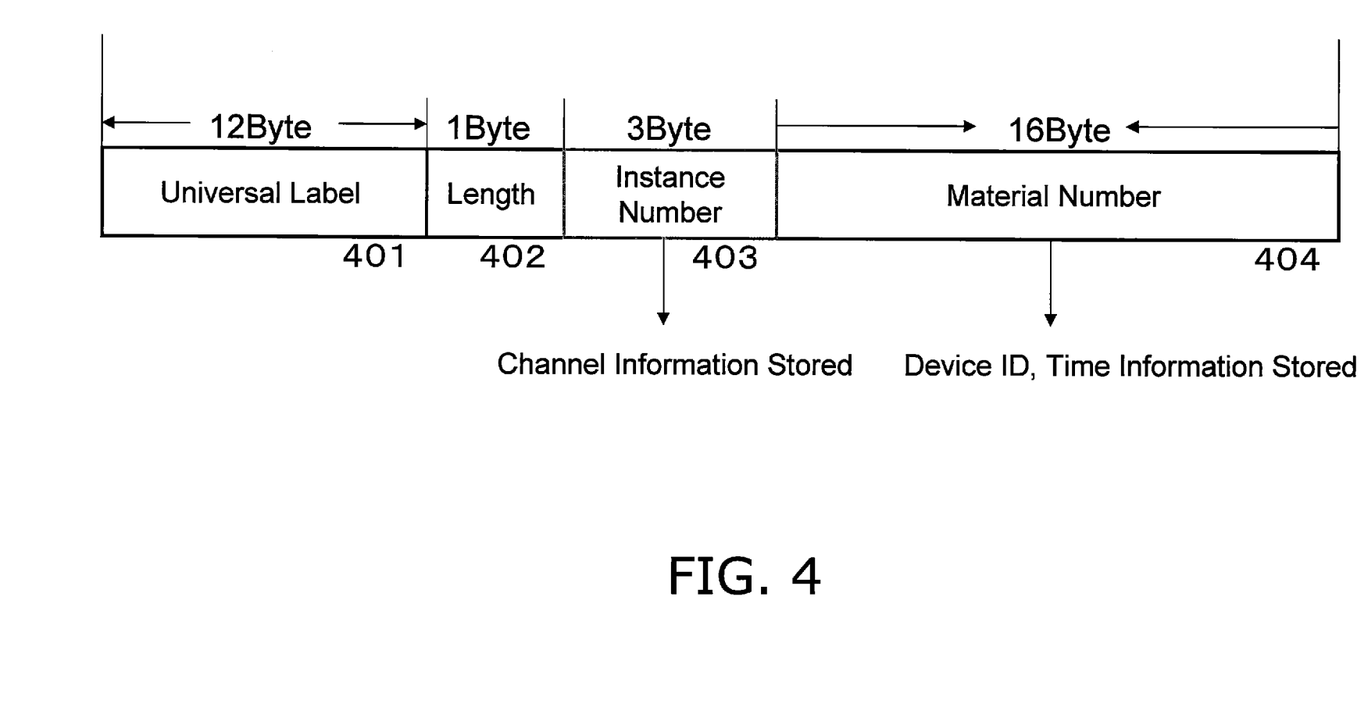
FIG. 4 is a diagram illustrating the data format of a UMID.

FIG. 4 is a diagram which illustrates the data format of the UMID specified by SMPTE 330M. The UMID is an identifier to uniquely identify an image, and is configured of a universal label 401, length information 402, an instance number 403, and a material number 404.

The universal label 401 is a label for defining the type of data such as the type of a material. For example, the universal label 401 is used to distinguish whether data is moving picture data or audio data. FIG. 4 illustrates an example in which the data is moving picture data. The universal label 401 is configured of a fixed byte string defined by SMPTE 330M. The length information 402 expresses the length of data which follows after the instance number 403. The instance number 403 is information indicating the origin of the data. The instance number 403 also included in channel information which indicates whether image data is from the L channel or the R channel. The material number 404 defines a device ID and time information. The device ID includes, for example, the MAC address of the device, the network node ID of IEEE 1394 or the like. The material number 404 is a device-unique byte string created from the device ID and the time information.

2: Operations of Image Recording System

A 3D image is configured from an L channel image signal and an R channel image signal. When the 3D imaging apparatus 1 starts shooting, the L channel image signal and the R channel image signal are output from the 3D imaging apparatus 1. The L channel image signal is input into the image input unit 101 of the image recording apparatus 100 from the 3D imaging apparatus 1. The R channel image signal is input into the image input unit 201 of the image recording apparatus 200 from the 3D imaging apparatus 1.

Figure 5A:
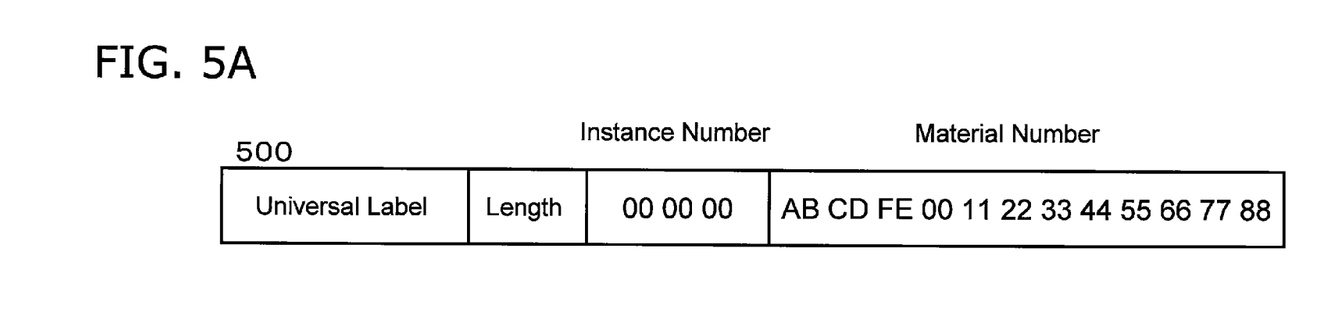
FIG. 5A to 5C is a diagram illustrating the data format of a UMID.

The UMID creation unit 107 of the image recording apparatus 100 creates a UMID 500, in which the instance number 403 is not set, based on the device ID obtained from the device ID obtainment unit 104 and the time information obtained from the time information obtainment unit 105. The data structure of this UMID 500 is indicated in FIG. 5A. Here, the device ID obtainment unit 104 holds a device ID for uniquely identifying the image recording apparatus 100, and outputs information of this device ID to the UMID creation unit 107. The time information obtainment unit 105 outputs, for example, the time at which the input of the image signal started, as the time information.

When channel information indicating that an image signal is an L channel image signal is input by the channel information input unit 106, the UMID creation unit 107 creates a UMID 501 in which the channel information is set in the instance number 403. Note that information indicating that the image signal is an L channel image signal maybe input by an operator before the start of imaging operations on the channel information input unit 106, or the information indicating that the image signal is an L channel image signal may be set in the image recording apparatus 100 in advance on the channel information input unit 106 when the image recording system is configured.

Figure 5B:
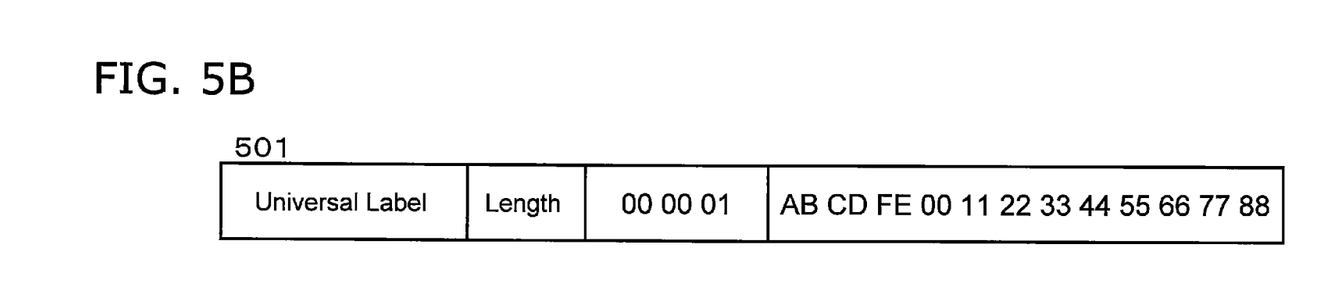

FIG. 5B illustrates the data structure of the UMID 501. In FIG. 5B, predetermined channel information indicating that the image signal is an L channel image signal, such as "000001", is stored in the instance number 403 of the UMID 501.

The image input unit 101 outputs the input image signal to the encoder 102. The encoder 102 compresses the image signal using a codec, such as a DV format codec, an MPEG (Moving Picture Experts Group) format codec, or the like. Note that the compression technique is not limited to these techniques, and any technique may be employed. The file creation unit 103 creates a file of the compressed data output by the encoder 102.

The UMID addition unit 108 adds the UMID 501 to the image file created by the file creation unit 103, and records the image file in the image file recording unit 109.

The recording medium in which the image file recording unit 109 records the image file is a semiconductor memory card, a hard disk, magnetic tape, or an optical disc such as a DVD (Digital Versatile Disc), a BD (Blu-ray Disc), or the like. Note that the recording medium is not limited thereto, and any recording medium may be used as long as it is capable of recording an image signal. In addition, the recording medium may be mounted inside the image recording apparatus 100, or may be removable.

The UMID sending unit 110 sends the UMID 501 created by the UMID creation unit 107 to the image recording apparatus 200.

Figure 5C:
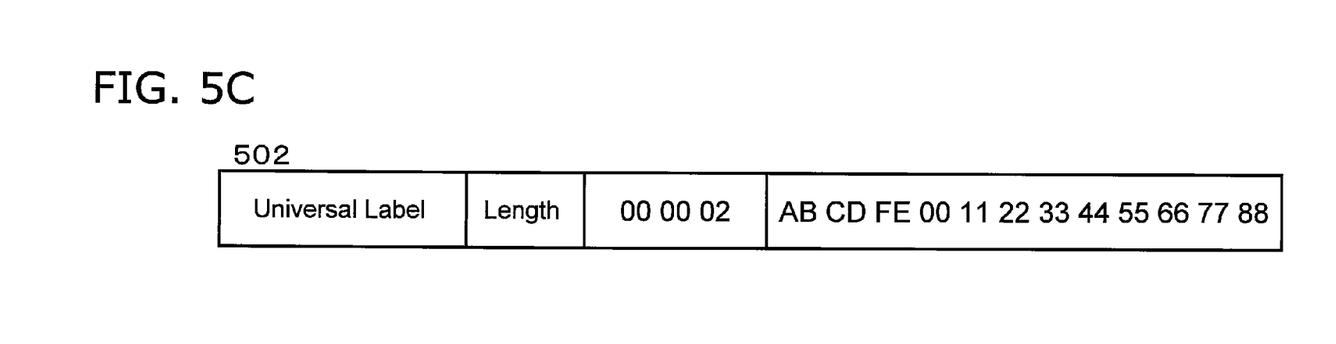

The image recording apparatus 200 receives the UMID 501 sent from the UMID sending unit 110 on the UMID receiving unit 204. After this, when channel information indicating that an image signal is an R channel image signal is input by the channel information input unit 205, the UMID changing unit 206 creates a UMID 502, in which the instance number included in the UMID 501 received by the UMID receiving unit 204 has been changed. FIG. 5C illustrates the data structure of the UMID 502. In FIG. 5C, the instance number of the UMID 502, such as the channel information, is changed from "000001" to "000002".

The image input unit 201 outputs the image data to the encoder 202. The encoder 202 compresses the image signal using the same compression technique as the encoder 102 of the image recording apparatus 100. Note that the compression technique employed by the encoder 202 is not limited thereto, and any technique may be used, including compression techniques that differ from those employed by the encoder 102. The file creation unit 203 creates a file of the compressed data output by the encoder 202.

The UMID addition unit 207 adds the UMID 502 to the image file created by the file creation unit 203. The image file recording unit 208 records the image file to which the UMID 502 has been added. The recording medium in which the image file recording unit 208 records the image file may be the same recording medium as the recording medium of the image recording apparatus 100, or may be a different recording medium. That recording medium may be any type of recording medium.

3: Features

In a typical image recording system, UMIDs are generated independently on each of multiple image recording apparatuses of which the image recording system is configured. Accordingly, it has been difficult to cause the material numbers in the UMIDs, such as the device IDs and time information of the image recording apparatuses, to match in all of the image recording apparatuses. Specifically, it has been difficult to associate the L channel UMID and the R channel UMID with each other.

However, on the image recording system according to the present embodiment, the UMID 501 (see FIG. 5B) is added as the UMID for the L channel and the UMID 502 (see FIG. 5C) is added as the UMID for the R channel For this reason, even if the present system includes multiple 3D files, such as multiple pieces of 3D content, multiple pieces of 3D content that have the same UMID material number can be identified as a content pair recorded at the same time. Furthermore, the L channel and the R channel in the 3D content pair can easily be identified by their instance numbers. Meanwhile, a channel identifier is not set in the instance number (see FIG. 5A) on a 2D file such as 2D content, and thus 2D content can be distinguished from 3D content with ease.

Further still, in the case that content has been recorded simultaneously by multiple imaging apparatuses, the first byte of the instance number is set to the number of imaging apparatuses, and the final byte of the instance number is set to a channel identifier. Thus content that has been recorded at the same time can be easily identified.

Although the present embodiment describes an example in which the image recording apparatus 100 and the image recording apparatus 200 are connected via a network, the same effect can be achieved even if a different connection method, such as a USB, RS-422, or similar interface is used.

Second Embodiment

1. Configuration of Image Recording Apparatus

Figure 3:
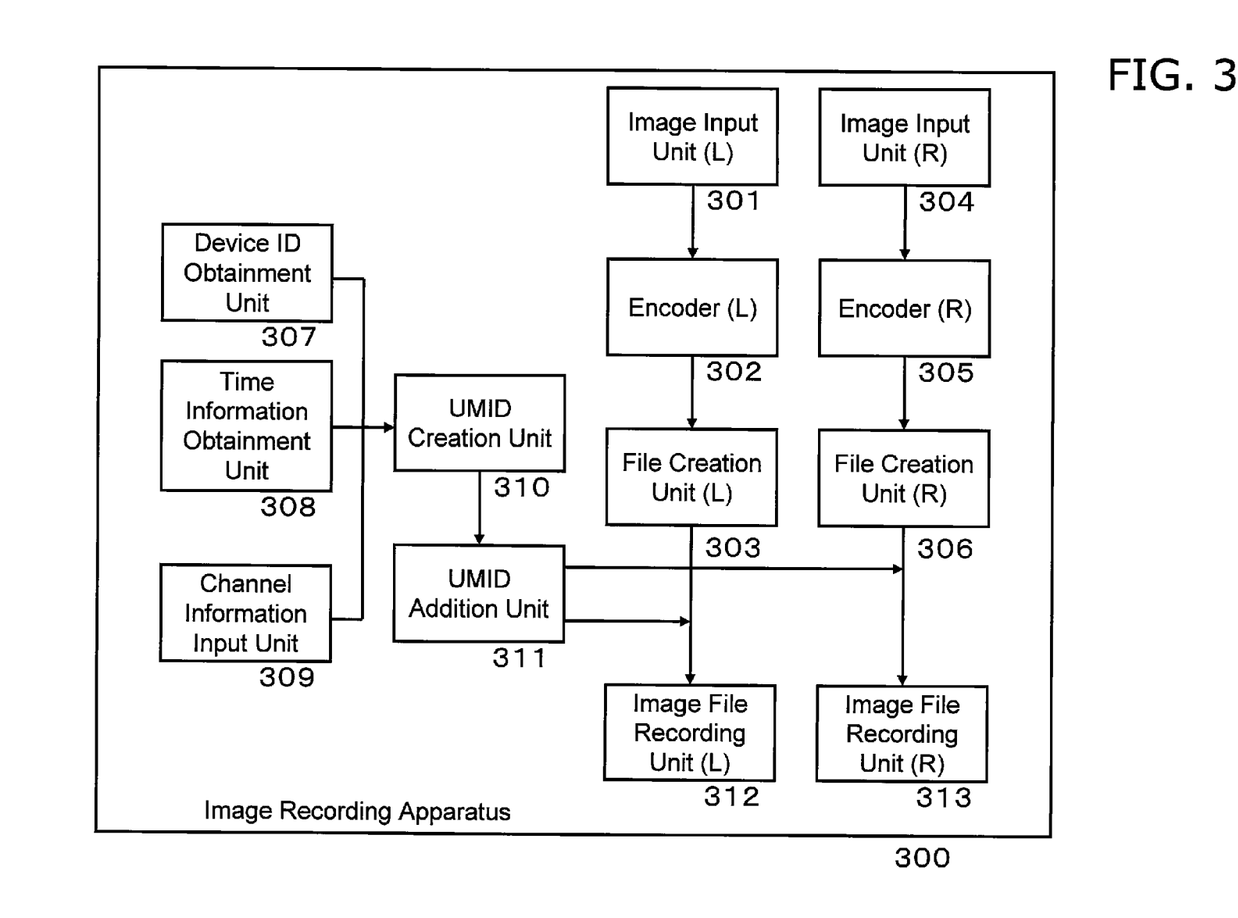
FIG. 3 is a block diagram illustrating the configuration of an image recording apparatus according to a second embodiment.

FIG. 3 is a block diagram which illustrates the configuration of an image recording apparatus according to a second embodiment. An image recording apparatus 300 is configured of an image input unit (L) 301, an encoder (L) 302, a file creation unit (L) 303, an image input unit (R) 304, an encoder (R) 305, a file creation unit (R) 306, a device ID obtainment unit 307, a time information obtainment unit 308, a channel information input unit 309, a UMID creation unit 310, a UMID addition unit 311, an image file recording unit (L) 312, and an image file recording unit (R) 313.

An L channel image signal is input into the image input unit (L) 301. The encoder (L) 302 encodes an image signal input into the image input unit (L) 301. The file creation unit (L) 303 creates a file (for example, an MXF file) from the data encoded by the encoder (L) 302.

An R channel image signal is input into the image input unit (R) 304. The encoder (R) 305 encodes an image signal input into the image input unit (R) 304. The file creation unit (R) 306 creates a file from the data encoded by the encoder (R) 305.

The device ID obtainment unit 307 identifies the device that created a file by obtaining information of the device that created the file. The time information obtainment unit 308 obtains time information. The channel information input unit 309 inputs channel information of the L channel and the R channel The UMID creation unit 310 creates a UMID based on the information obtained by the device ID obtainment unit 307, the time information obtainment unit 308, and the channel information input unit 309.

The UMID addition unit 311 adds an L channel UMID, which contains information of the L channel created by the UMID creation unit 310, to the image file output from the file creation unit (L) 303. Furthermore, the UMID addition unit 311 adds an R channel UMID, which contains information of the R channel created by the UMID creation unit 310, to the image file output from the file creation unit (R) 306.

The image file recording unit (L) 312 records an image file to which the UMID has been added by the UMID addition unit 311. The image file recording unit (R) 313 records an image file to which the UMID has been added by the UMID addition unit 311.

Note that the compression techniques employed by the encoder (L) 302 and the encoder (R) 305 may be any compression techniques, as in the first embodiment. Furthermore, the recording media in which the image file recording unit (L) 312 and the image file recording unit (R) 313 records the image file may be any recording media, as in the first embodiment.

2. Operations of Image Recording Apparatus

A 3D image is configured from an L channel image signal and an R channel image signal. When the 3D imaging apparatus 1 starts shooting, the L channel image signal and the R channel image signal are output from the 3D imaging apparatus 1. The L channel image signal is input into the image input unit (L) 301 and the R channel image signal is input into the image input unit (R) 304.

The UMID creation unit 310 of the image recording apparatus 300 creates an L channel UMID 501 based on the device ID obtained from the device ID obtainment unit 307, the time information obtained from the time information obtainment unit 308, and the channel information (L) obtained from the channel information input unit 309. Furthermore, the UMID creation unit 310 creates an R channel UMID 502 based on the device ID obtained from the device ID obtainment unit 307, the time information obtained from the time information obtainment unit 308, and the channel information (R) obtained from the channel information input unit 309.

The image input unit (L) 301 outputs the image data to the encoder (L) 302 which compresses the image. The file creation unit (L) 303 creates a file of the compressed data output by the encoder (L) 302. Likewise, the image input unit (R) 304 outputs the image data to the encoder (R) 305 which compresses the image. The file creation unit (R) 306 creates a file of the compressed data output by the encoder (R) 305.

The UMID addition unit 311 adds the L channel UMID 501 to the image file created by the file creation unit (L) 303. The image file recording unit (L) 312 records the image file to which the L channel UMID 501 has been added. Furthermore, the UMID addition unit 311 adds the R channel UMID 502 to the image file created by the file creation unit (R) 306. The image file recording unit (R) 313 records the image file to which the R channel UMID 502 has been added.

3. Features

As described thus far, with the image recording apparatus according to the present embodiment, the UMID 501 (see FIG. 5B) is added to the L channel image signal input from the exterior as the L channel UMID and the UMID 502 (see FIG. 5C) is added to the R channel image signal input from the exterior as the R channel UMID. For this reason, even if the present system includes multiple 3D files, or in other words, multiple pieces of 3D content, multiple pieces of 3D content that have the same UMID material number can be identified as a content pair recorded at the same time. Furthermore, the L channel and the R channel in the 3D content pair can easily be identified by their instance numbers. Meanwhile, a channel identifier is not set in the instance number (see FIG. 5A) on a 2D file, or in other words, 2D content, and thus 2D content can be distinguished from 3D content with ease.

Other Embodiments

Although the first and second embodiments employ UMIDs as identification information, the present invention is not limited thereto, and can also be applied in a case where unique information of the image recording apparatuses that record image signals is used as the identification information.

In addition, although the first embodiment describes an example in which the left-lens image recording apparatus 100 acts as the master and the right-lens image recording apparatus 200 acts as the slave, the present invention is not limited thereto, and this relationship may take on any form. For example, the right-lens image recording apparatus 200 may act as the master and the left-lens image recording apparatus 100 may act as the slave.

Furthermore, the timing at which the UMID is added to the file (container) may be any timing in the first and second embodiments. For example, if the files can be accessed at random, the UMID can be added to a file before or after the data encoded by the encoder is stored in the file. Accordingly, the addition of the UMID and the writing of the image information can be carried out at any desired timing.

Furthermore, in the first and second embodiments, the UMID in the stated format can be applied to audio signals in addition to image signals. In such a case, the universal label 401 of the UMID is set to a value for audio. This setting makes it possible to carry out the same processing as described above and to achieve the same effects as described above.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of image recording apparatus, image recording system, and image recording method. Accordingly, these terms, as utilized to describe the present invention should be interpreted relative to image recording apparatus, image recording system, and image recording method.

The term "configured" as used herein to describe a component, section, or part of a device implies the existence of other unclaimed or unmentioned components, sections, members or parts of the device to carry out a desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

INDUSTRIAL APPLICABILITY

The image recording system, image recording apparatus, and image recording method according to the present invention can be applied in image recording apparatuses for 3D images and image recording apparatuses that record 3D images and 2D images in a mixed state. On such an image recording system, image recording apparatus, and image recording method, even if 3D image is recorded as two pieces of content, it is easy to identify an L channel and R channel recorded at the same time as a pair and distinguish between 3D content and 2D content.

What is claimed is:

1. An image recording system comprising:
    first and second image recording apparatuses that record first and second image signals, respectively, the first and second image signals configuring a 3D image,
    wherein the first image recording apparatus includes:
    a device ID obtainment unit configured to identify the first image recording apparatus;
    a time information obtainment unit configured to obtain time information;
    a first channel information input unit configured to input channel information identifying whether an image signal is the first image signal or the second image signal;
    an identification information creation unit configured to create identification information uniquely identifying the image signal based on the information obtained by the device ID obtainment unit, the time information obtainment unit, and the first channel information input unit;
    a first image input unit configured such that the first image signal is input therein;
    a first identification information addition unit configured to add the identification information created by the identification information creation unit to the first image signal;
    a first image recording unit configured to record the first image signal to which the identification information has been added by the first identification information addition unit; and
    an identification information sending unit configured to send, to the second image recording apparatus, the identification information created by the identification information creation unit, and
    the second image recording apparatus includes:
    an identification information receiving unit configured to receive the identification information sent from the identification information sending unit of the first image recording apparatus;
    a second channel information input unit configured to input channel information identifying whether an image signal is the first image signal or the second image signal;
    an identification information change unit configured to change the identification information received by the identification information receiving unit based on the channel information input by the second channel information input unit;
    a second image input unit configured such that the second image signal is input therein;
    a second identification information addition unit configured to add identification information obtained by the identification information change unit to the second image signal; and
    a second image recording unit configured to record the second image signal to which the identification information has been added by the second identification information addition unit.

2. The image recording system according to claim 1, wherein the first image recording apparatus further includes:
    a first encoder configured to encode the first image signal input into the first image input unit; and
    a first file creation unit configured to create a first file including data encoded by the first encoder,
    the second image recording apparatus further includes:
    a second encoder configured to encode the second image signal input into the second image input unit; and
    a second file creation unit configured to create a second file including data encoded by the second encoder, and
    the first identification information addition unit configured to add the identification information obtained by the first identification information creation unit to the first file;
    the first image recording unit is configured to record the first file to which the identification information has been added by the first identification information addition unit;
    the second identification information addition unit is configured to add the identification information obtained by the second identification information creation unit to the second file; and
    the second image recording unit is configured to record the second file to which the identification information has been added by the second identification information addition unit.

3. The image recording system according to claim 1, wherein the identification information creation unit is configured to create a UMID (Unique Material Identifier) as the identification information.

4. An image recording apparatus that records first and second image signals that configure a 3D image, the apparatus comprising:
- a device ID obtainment unit configured to identify the image recording apparatus;
- a time information obtainment unit configured to obtain time information;
- a channel information input unit configured to input channel information identifying whether an image signal is the first image signal or the second image signal;
- an identification information creation unit configured to create identification information based on the information obtained by the device ID obtainment unit, the time information obtainment unit, and the channel information input unit;
- a first image input unit configured such that the first image signal is input therein;
- a second image input unit configured such that the second image signal is input therein;
- an identification information addition unit configured to add first identification information identifying the first image signal to the first image signal and to add second identification information identifying the second image signal to the second image signal, the first identification information identifying the first image signal and the second identification information identifying the second image signal obtained by the identification information creation unit;
- a first image recording unit configured to record the first image signal to which the first identification information has been added by the identification information addition unit; and
- a second image recording unit configured to record the second image signal to which the second identification information has been added by the identification information addition unit.

5. An image recording method that records first and second image signals that configure a 3D image in first and second image recording apparatuses, respectively, the method comprising:
- identifying the first image recording apparatus;
- obtaining time information using the first image recording apparatus;
- inputting channel information identifying whether an image signal is the first image signal or the second image signal into the first image recording apparatus;
- creating identification information uniquely identifying the image signal based on the information obtained in the specifying step, the obtaining step, and the input step using the first image recording apparatus;
- inputting the first image signal into the first image recording apparatus;
- adding the identification information created in the creating step to the first image signal using the first image recording apparatus;
- recording the first image signal to which the identification information has been added in the adding step using the first image recording apparatus;
- sending, to the second image recording apparatus, the identification information created in the creating step using the first image recording apparatus;
- receiving the identification information sent from the first image recording apparatus into the second image recording apparatus;
- inputting channel information identifying whether an image signal is the first image signal or the second image signal into the second image recording apparatus;
- changing the identification information received in the receiving step based on the channel information input into the second image recording apparatus in the input step;
- inputting the second image signal into the second image recording apparatus;
- adding the identification information changed in the changing step to the second image signal using the second image recording apparatus; and
- recording the second image signal to which the identification information has been added in the adding step performed using the second image recording apparatus.

* * * * *